United States Patent
Buisson et al.

[11] 3,841,565
[45] Oct. 15, 1974

[54] INJECTORS FOR INJECTING A LIQUID, IN PARTICULAR A FUEL, INTO A HIGH TEMPERATURE SPACE SUCH AS A COMBUSTION CHAMBER

[75] Inventors: Marc Francois Bernard Buisson, Le Mee-sur-Seine; Claude Desiré Fouré, Courbevoie; Armand Jean-Baptiste LaCroix, Itteville; Hervé Alain Quillévéré, Issy-les-Moulineaux; Gilbert James Rousseau, Brie-comte-Robert, all of France

[73] Assignee: Societe Nationale d'Etude et de Construction de Moteurs d'Aviation, Paris, France

[22] Filed: July 20, 1973

[21] Appl. No.: 380,979

[30] Foreign Application Priority Data
July 21, 1972 France .............................. 72.26409

[52] U.S. Cl. ................................. 239/488, 239/553
[51] Int. Cl. .............................................. B05b 1/14
[58] Field of Search ........... 239/553, 487, 488, 486, 239/265.17

[56] References Cited
UNITED STATES PATENTS
943,882   12/1909   Knappich ........................ 239/488 X
2,840,151   6/1958   Jackson .............................. 239/487

Primary Examiner—M. Henson Wood, Jr.
Assistant Examiner—Michael Y. Mar
Attorney, Agent, or Firm—William J. Daniel

[57] ABSTRACT

A liquid injection manifold, in particular for fuel, comprising a tube containing at least one row of injection ports, wherein said tube is divided by a twisted longitudinal partition into two passages through which the liquid introduced by a feed pipe flows along the whole of the manifold and is applied by centrifugal force against the wall of said manifold.

9 Claims, 19 Drawing Figures

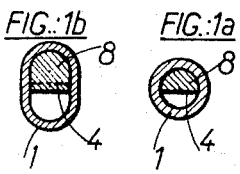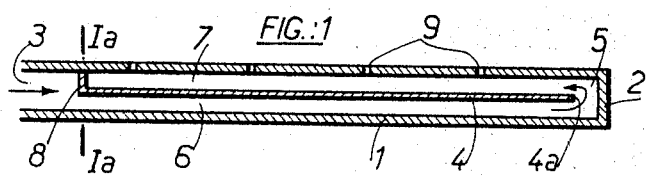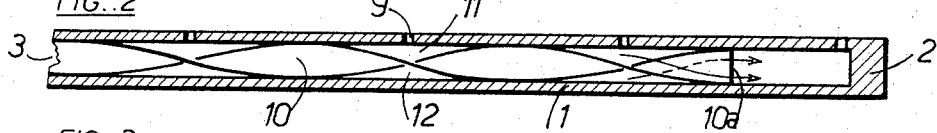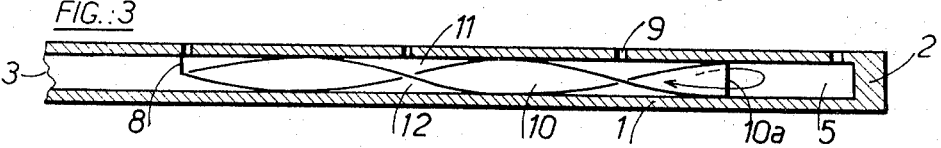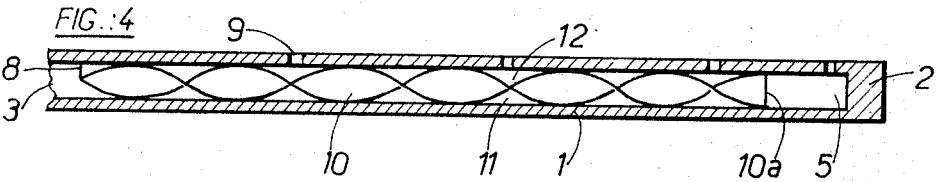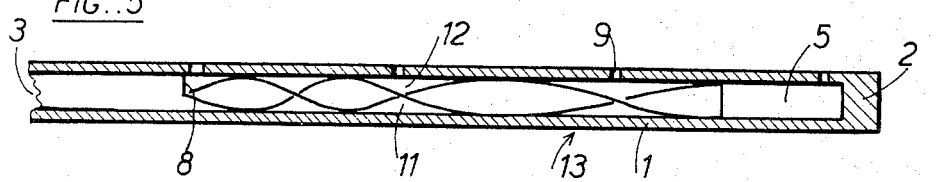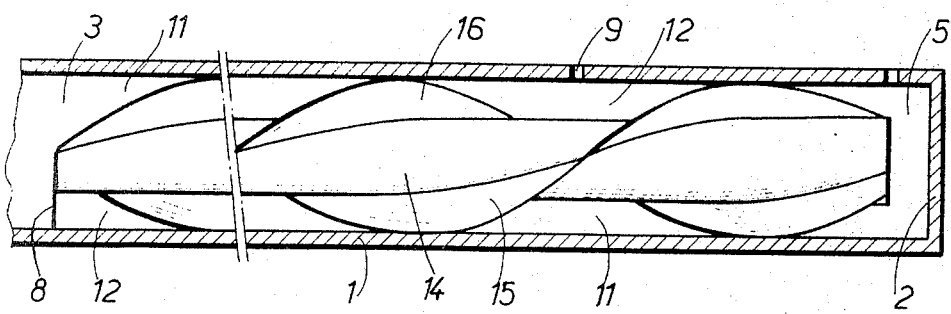

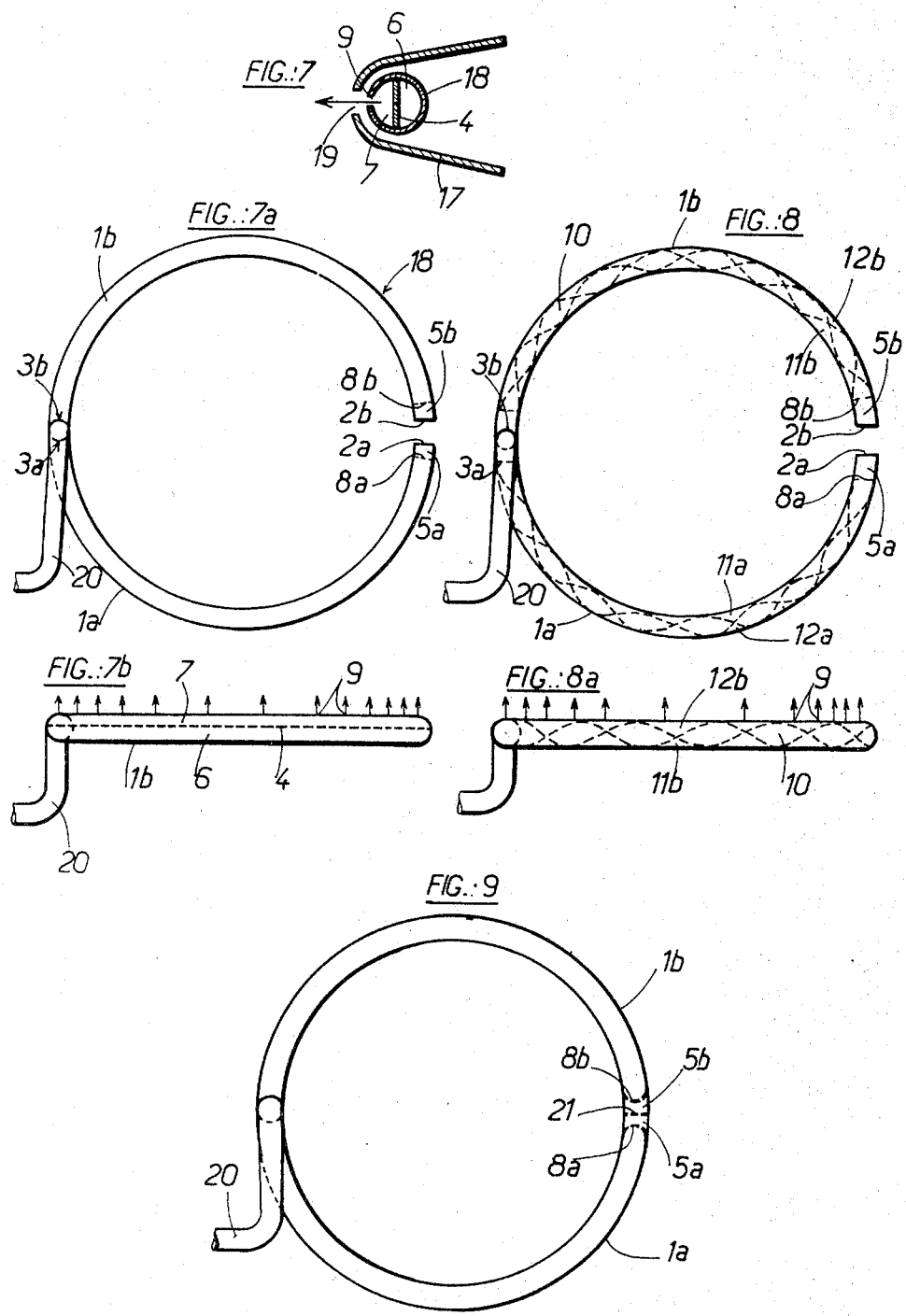

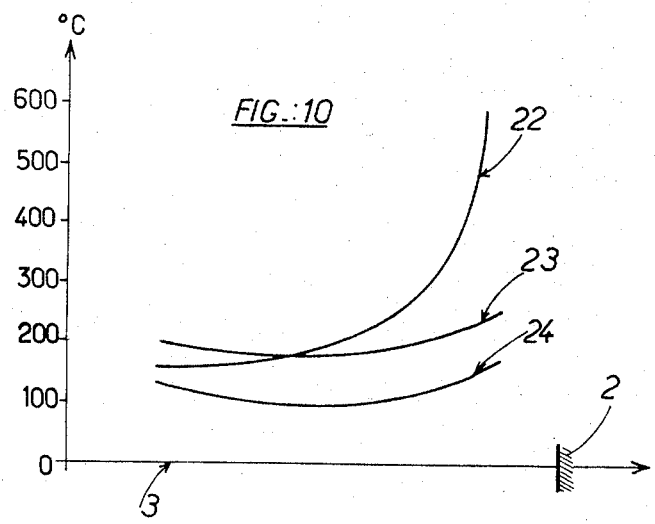
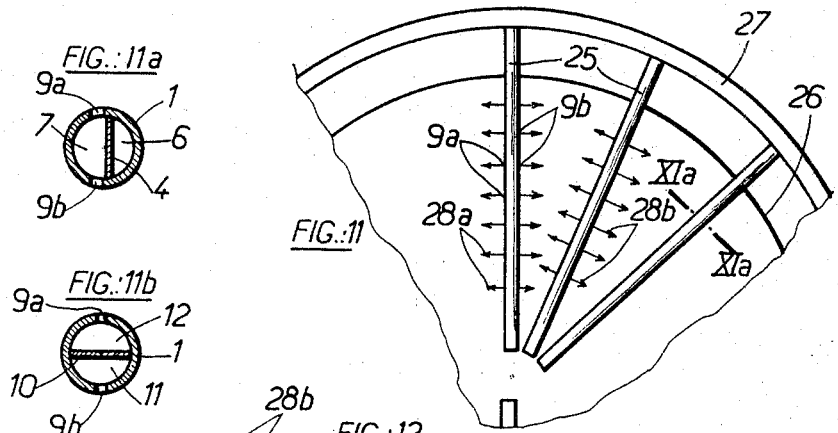
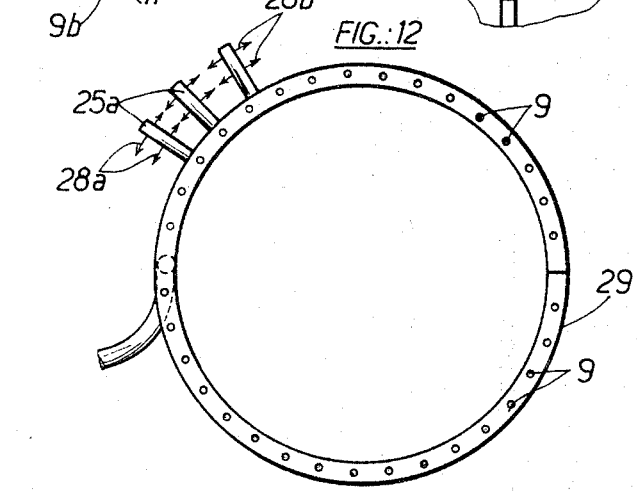

INJECTORS FOR INJECTING A LIQUID, IN PARTICULAR A FUEL, INTO A HIGH TEMPERATURE SPACE SUCH AS A COMBUSTION CHAMBER

The present invention relates to devices which are used to inject a liquid into a high temperature space such as a combustion chamber. It relates more particularly, but not exclusively, to the injection of fuel into the afterburner duct of an aircraft turbojet engine. It can equally well be applied to the injection of a liquid ergol, or a liquified or cryogenic gas, into the combustion chamber of a rocket engine. It relates more particularly to improvements in fuel manifolds constituted by tubes incorporating each at least one row of injection ports generally arranged upon a generatrix.

The development of technology has led to the construction of aircraft turbojet engines in which the temperatures at the turbine exit are becoming progressively higher and higher. On the other hand, frequently the fuel is used as a cooling agent for the various elements, so that it is heated up. Moreover, the fuel experiences substantial heating in the pumps and tanks during long supersonic flights. The fuel therefore arrives hot at the manifolds, these latter themselves being externally exposed to very high temperatures. The result is that in particular in the case of turbojet engines in which afterburning can be controlled by the pilot, risks of vapour lock or coking in the manifolds.

The liquid injection, for example fuel injection is generally effected by means of toroidal manifolds and/or rectilinear injectors sometimes referred to as "pencil" injectors, disposed transversely in the high temperature space, for example, radially in an afterburner duct. The toroidal manifolds are sometimes located between the walls of V-section flame-holder rings, and thus in a hot gas backwash zone where there is an increased risk of the manifolds temperature being raised.

The means currently used to prevent vapor lock and coking in manifolds generally comprise screens located outside the injectors in order to protect them by reducing the heat flow transmitted to them by convection and radiation. The screens have the particular drawback of substantially increasing the aerodynamic drag of the injection device, in the hot gas flow, as well as the bulk and weight of the device. Moreover, the screens are not always adequately efficient.

It is generally at the end of a manifold, that is to say the point where the fuel flow velocity through the manifold becomes low, that there is the greatest risk of coking. However, coking can also occur at locations which would appear theoretically at any rate to be least critical, but which are probably subjected to a very high local heat flow producing vapourisation of the fuel along the manifold wall.

The object of the present invention is to introduce improvements which will make it possible to avoid the risks of vapour lock and coking in a manifold, and even make it possible in some cases to omit the conventional external protective devices such as the screens referred to hereinbefore.

According to the invention, there is provided a liquid injection manifold, in particular for fuel, comprising a tube containing at least one row of injection ports, wherein said tube is divided by a twisted longitudinal partition into two passages through which the liquid introduced by a feed pipe flows along the whole of the injector and is applied by centrifugal force against the wall of said manifold.

The liquid flowing through the manifold is thus given a rotational component which creates in the flow a centrifugal force field applying the liquid against the wall of the manifold whilst, if liquid vapour forms in contact with this wall, it is attracted towards the axis of the manifold where it condenses again.

Preferably, the two parallel passages carry the liquid in opposite directions and comprise a supply passage where a high fuel flow is channeled, this cooling the manifold over the whole of its length, and a return tube which supplies at least some of the injection ports. In one embodiment, the partition is a central partition, that is to say disposed markedly between two diametrally opposite generatrices of the tube forming the manifold, and dividing the latter into two passages of substantially circular cross-section, one of which, the return passage, is closed off at the end of the manifold where the fuel is supplied, said partition halting slightly before the other end of the manifold in order that said return passage can communicate with the supply passage.

The invention will now be further described, by way of non-restrictive example, with reference to the accompanying drawings, in which:

FIG. 1 is a schematic longitudinal section through a fuel manifold in accordance with the invention, illustrating an embodiment which comprises a flat partition;

FIG. 1a is a transverse section on the line 1a—1a of FIG. 1;

FIG. 1b is a view similar to FIG. 1a, showing a variant embodiment;

FIG. 2 is a view similar to FIG. 1, showing an embodiment comprising a twisted partition;

FIGS. 3 and 4 are views similar to FIG. 2, respectively illustrating two further embodiments of the manifold with a twisted partition;

FIGS. 5 and 6 are views similar to FIG. 4, illustrating a variant embodiment thereof;

FIG. 7 is the transverse section of a toroidal manifold located between the walls of a V-section flame-holder;

FIGS. 7a and 7b are respective elevational and plan views, on a smaller scale, of a toroidal manifold of FIG. 7;

FIGS. 8 and 8a are views which are respectively similar to FIGS. 7a and 7b, showing another embodiment;

FIG. 9 is a view similar to FIGS. 7a and 8, illustrating a variant embodiment;

FIG. 10 is a graph illustrating the development of the temperature along the wall of a manifold;

FIG. 11 is a partially schematic transverse section of an afterburner duct, showing the arrangement of pencil injectors in said duct;

FIG. 11a is a schematic sectional view on a larger scale, on the line XIa—XIa of FIG. 11;

FIG. 11b is a view similar to that of FIG. 11a, showing another embodiment;

FIG. 12 is an elevational view of a toroidal manifold to which pencil injectors have been welded.

In the drawings, like parts are denoted by like reference numerals.

In FIGS. 1 and 1a, a manifold can be seen, constituted by a circular-section metal tube 1 one end 2 of which is closed and the other end 3 open. Through said open end, there has been inserted into the tube, a metal strip 4 having a width substantially equal to the internal diameter of the tube, leaving a passage 5 between the end 4a of the strip and the closed end 2 of the tube. The metal strip 4 thus acts as a partition dividing the tube 1 into two parallel passages 6, 7. The passage 7 is closed off at 8, at its end near the open end 3 of the tube 1, and a row of injection ports 9 arranged upon a generatrix of the cylinder constituted by the external surface of the tube 1, passes through the wall thereof, opening into the passage 7.

It should be understood that FIG. 1, like FIGS. 2 to 6, are purely schematic illustrations designed to indicate, in respect of the various embodiments of the invention, what are the relative dispositions of the partition, the injection ports and the tube which together form the manifold. In particular, the tube has been shown as a rectilinear structure in all these Figures but its true form could equally well be one of those illustrated in FIGS. 7 to 9 and 11 to 12.

When the manifold shown in FIG. 1 is arranged in a hot gas flow, for example in the afterburner duct of a turbojet engine (not shown), and if the open end 3 of the tube is supplied with liquid fuel (by means which have not been shown), the whole of the fuel flow supplied to the manifold will circulate through the supply passage 6 to the closed end of the tube, and then through the passage 5, will enter the return passage 7 in order to supply the injection ports 9. The fuel flow in this return passage will thus progressively decrease from the passage 5 onwards, and will virtually cease altogether in the neighbourhood of the closure 8, but, because of the fact that the fuel flow in the passage 6 is constant from one end of the manifold to the other, the wall of the latter will be better cooled and more uniformly than would be the case in the absence of the partition 4.

The applicants have carried out tests and established that the presence of the partition 4 does not produce any substantial increase in the pressure drop experienced by the fuel through the manifold; the applicants advocate the use, for a manifold, of a tube 1 having the same section as the tube which would have been employed to form a manifold without the partition. The fuel flow velocities in the manifold are consequently increased, reducing the risk of local vapourisation in contact with the wall in the neighbourhood of the injection ports 9.

The section of the tube 1 need not necessarily be circular. It might even be advantageous to give it an oval form and to arrange the partition in accordance with the smaller axis of the oval section, as shown in FIG. 1b.

FIGS. 2, 3 and 4 illustrate embodiments in accordance with which there has been introduced into the tube 1, through its open end 3, a twisted metal strip 10 which has been attached to the wall of the tube by welding or brazing. As formerly explained, this twisted partition produces rotation in the fuel delivered through the manifold via the open end 3, so that the liquid fuel is applied against the wall of the tube 1, and, if vapour forms on contact with the wall, it is attracted towards the tube axis where it condenses again. The cooling of the tube wall is extremely efficient, as will be demonstrated later in relation to FIG. 10. The applicants have experimentally verified that the presence of the twisted partition does not reduce the flow rate of the manifold and indeed even tends to increase it. It appears that the centrifugal force field created by the fuel flow through the helical passages 11, 12 located at either side of the twisted partition 10, increases the flow rate of the injection ports 9, compensating for the pressure drop imposed upon the fuel flow by its friction with the partition.

In the embodiment shown in FIG. 2, the injection ports 9, arranged upon a generatrix of a tube 1, are spaced at half the pitch of the helix formed by the partition 10 so that they open alternately into the psssages 11 and 12. Neither of these passages is closed off at its inlet end; the fuel flow entering through the open end 3 of the tube 1, thus splits into two flows which run parallel and in the same direction, through the passages 11, 12 each supplying the corresponding injection ports. In this embodiment, the fuel flow in the manifold in the neighbourhood of the end 2, is low, and the improvements in the cooling of the manifold is due solely to the centrifugal effect produced by the partition twist.

In the embodiment shown in FIG. 3, the injection ports 9 are again spaced at half the pitch of the helix formed by the partition 10, but the passage 12 is closed off at 8 as in the embodiment shown in FIG. 1. The fuel supplied via the open end 3 of the manifold thus flows through the supply passage 11, feeding as it does so those of the injection ports 9 which open into the passage 11, then, enters the return passage 12, via the passage 5, whence it flows in the opposite direction to supply the other ports 9. The fuel flow thus tapers off from the inlet 3 to the passage 5, in the passage 11, and from the passage 5 to the end 8 of the return passage 12 so that the wall of the tube 1 is cooled virtually uniformly from one end of the tube to the other.

In FIG. 4, the injection ports 9 are spaced at one pitch of the helix and all open into the return passage 12. The fuel circulation is thus on the same pattern as in FIG. 1, that is to say the whole of the fuel flow passes through the supply passage from one end to the other thereof, but in addition the partition 10 is twisted and produces the already mentioned centrifugal effect. It is the embodiment of FIG. 4 which seems to give the best manifold cooling, but it can be seen from the drawing that the partition 10 is twisted at a pitch which is half that of the case shown in FIG. 3, for the same spacing of the injection ports 9. In certain cases and in particular with very long manifolds, it may therefore be advantageous to arrange for the disposition of FIG. 3 to be used.

FIG. 5 illustrates a variant embodiment in which, in a zone 13 of the manifold which is exposed to a particularly high heat flow, the pitch of the helix formed by the patittion 10 is decreased in order to improve the cooling by centrifugal effect.

In FIG. 6, the twisted partition comprises a central body or cylindrical core 14 around which there are helically wound two diametrally opposite strips 15, 16 which divide the tube into a supply passage 11 and return passage 12 as in the case of FIG. 1. In other embodiments (not shown) the central body could be other than cylindrical; in particular, in the case where the two passages 11, 12 are supplied in parallel as in FIG. 2, the central body could have a section which increases from the open end 3 of the tube 1 to its closed end 2, so that the fuel flow in each of the passages 11, 12 is substantially constant.

FIGS. 7, 7a and 7b illustrate a device, commonly known as a "burner ring", comprising a flame stabilizer ring 17, V-shaped in cross section, disposed transversely in the afterburner duct of an aircraft turbojet engine (not shown) and containing a toroidal manifold 18 whose injection ports 9 are disposed in order to inject the fuel through ports 19 formed at the apex of the V, in return flow with the hot gas flow which is passing through the afterburner duct. The toroidal manifold 18 comprises two tubes 1a, 1b similar to the tube 1 shown in FIG. 1, each curved in semicircular fashion and the entry ends 3a, 3b of which are connected together and taken to a fuel feed pipe 20, their closed ends 2a, 2b, being virtually contiguous. Each of these tubes is split into a supply passage 6 and a return passage 7 by a partition 4 similar to that of FIG. 1, the extremities of which partitions can be seen at 8a, 8b. The fuel entering the manifold through the pipe 20 flows simultaneously through the passages 6 of the two tubes, then through the passages 5a, 5b and enters the return passages 7 to supply the injection ports 9.

The embodiment shown in FIGS. 8 and 8a differs from the embodiment shown in FIGS. 7, 7a, and 7b purely by the fact that the partitions 10 are twisted as in FIG. 4. Here, again, the fuel flows simultaneously through the passages 11a, 11b and then through the return passages 12a, 12b, in order to supply the injection ports 9.

FIG. 9 illustrates a variant embodiment of the embodiments shown in FIGS. 7a, 7b and 8, 8a, in which the tubes 1a or 1b are the two halves of a continuous toroidal tube, separated by a partition 21 diametrally opposite the supply of the two halves of the tube, by the pipe 20.

The tests carried out by the applicants were based upon three manifolds of the same diameter, injecting the same fuel flow rate, namely those of a conventional burner ring (without any longitudinal partition in the manifold) a burner ring with a central partition as in FIGS. 7 and 7b, and a burner ring with a twisted partition whose injection ports were supplied purely from a return passage, as in FIGS. 8 and 8a, and the graphs shown in FIG. 10 were plotted from these three manifolds. In this Figure, the ordinates plot the wall temperatures (in degrees centrigrade) at various points on the manifold, between its inlet end 3 and its closed end 2. The graph 22 pertains to a conventional burner ring provided with a protective screen (not shown); it can be seen that the temperature is very high at the downstream end 2 of the manifold. The curve 23 pertains to the burner ring with a central partition, likewise equipped with a protective screen; it can be seen that the temperature at the end 2 of the manifold is considerably lower. The curve 24 pertains to the burner ring with a twisted partition (FIGS. 8 and 8a) without any protective screen; it will be seen that once again a substantial reduction in temperature has been achieved despite the removal of the screen.

FIG. 11 schematically illustrates a plurality of pencil injectors 25 disposed radially in an afterburner duct 26 and supplied with fuel through a peripheral collector 27 located outside the duct. Each pencil injector 25 is equipped with two rows of injection ports 9a, 9b disposed diametrally opposite one another and directed in order to discharge jets of fuel 28a, 28b transversely to the flow of the gases carried by the duct. It will be seen in FIG. 11a that if the tube 1 forming this kind of pencil injector is equipped with a central partition 4 as in the embodiment shown in FIG. 1, said central partition 4 must be slightly offset in relation to the diametral plane of symmetry passing through the two sets of orifices 9a, 9b, so that the latter open into the return passage 7. FIG. 11b illustrates an embodiment in which the partition 10 is twisted and the passages 11 and 12 each supply a certain number of injection ports.

FIG. 12 schematically illustrates an arrangement in which the pencil injectors 25a, designed to emit fuel jets 28a, 28b transversely into an afterburner duct, are supplied by a toroidal manifold 29 equipped with injection orifices 9 disposed in counter flow fashion, that is to say directed up-stream of the duct. The manifold 29 and the pencil injectors 25a can be provided with central partitions as in FIG. 1, or with twisted partitions.

It goes without saying that the embodiments described are purely examples and are open to modification particularly by the substitution of equivalent techniques, without in so doing departing from the scope of the invention.

We claim:

1. A liquid manifold, in particular for fuel, comprising a tube containing at least one row of injection ports, said tube being divided by a twisted longitudinal partition into two passages through which the liquid entering the manifold flows along the whole of the manifold and is urged by centrifugal force against the wall of said manifold, one of the passages comprising a supply passage in which the liquid flows in one direction and the other a return passage in which the liquid flows in the opposite direction, said return passage communicating with at least some of the injection ports.

2. A manifold as claimed in claim 1, in which the return passage is closed adjacent the liquid entry end of the manifold and the partition short of the other end of the manifold to enable said return passage to communicate with said supply passage.

3. A manifold as claimed in claim 2, in which the supply passage cummunicates with some of the injection ports.

4. A manifold as claimed in claim 2, in which the return passage communicates with all the injection ports.

5. A manifold as claimed in claim 1, in which the partition is constituted by a twisted metal strip.

6. A manifold as claimed in claim 1, in which the partition comprises two diametrally opposite strips wound helically about a central body.

7. A liquid manifold, in particular for fuel, comprising a tube having an inlet end, a closed end, and a tubular wall having a plurality of injection ports therethrough arranged in spaced relation along a line parallel to the tube centerline; means for feeding the inlet end with liquid to form a flow of liquid in the tube; and a twisted longitudinal partition within said tube and dividing the same into first and second passages extending from an upstream end to a downstream end spaced from said closed end; the spacing of the injection ports in said tubular wall being such that said plurality of ports comprise first and second series of ports in communication with said first and second passages respectively, and at least one further injection port through the tubular wall beyond said downstream end.

8. A manifold according to claim 7 in which the partition is in the form of a twisted metal strip.

9. A manifold according to claim 7 in which the partition comprises two diametrically opposite strips wound helically about a central body.

* * * * *